United States Patent [19]
Ferber

[11] Patent Number: 5,587,967
[45] Date of Patent: Dec. 24, 1996

[54] METHOD FOR IMPROVEMENT OF SEISMIC SECTIONS

[75] Inventor: Ralf G. Ferber, Hanover, Germany

[73] Assignee: Prakla-Seismos GmbH, Hanover, Germany

[21] Appl. No.: 613,923

[22] Filed: Mar. 11, 1996

Related U.S. Application Data

[63] Continuation of Ser. No. 182,006, filed as PCT/EP93/01221, May 17, 1993, published as WO93/23771, Nov. 25, 1993, abandoned.

[30] Foreign Application Priority Data

May 15, 1992 [EP] European Pat. Off. .............. 92108259
May 29, 1992 [EP] European Pat. Off. .............. 92109082

[51] Int. Cl.$^6$ ............................... G01V 1/36; G01V 1/24
[52] U.S. Cl. ................................. 367/53; 367/21; 367/63; 364/421
[58] Field of Search ................................ 367/21, 53, 63; 364/421

[56] References Cited

U.S. PATENT DOCUMENTS

| | | | |
|---|---|---|---|
| 4,742,497 | 5/1988 | Beasley et al. | 367/50 |
| 4,797,861 | 1/1989 | Beasley | 367/52 |
| 5,050,129 | 9/1991 | Schultz | 367/63 |
| 5,051,960 | 9/1991 | Levin | 367/24 |
| 5,150,331 | 9/1992 | Harris et al. | 367/73 |

FOREIGN PATENT DOCUMENTS

| | | |
|---|---|---|
| 570615 | 11/1993 | European Pat. Off. . |
| 9323771 | 11/1993 | WIPO . |

OTHER PUBLICATIONS

Knapp, R. W., "Using Half–Integer Source Offset with Split Spread CDP Seismic Data", Geophysics: The Leading Edge of Exploration, pp. 66–69 and 108, Oct, 1985.

Ferber, R.–G., "Migration to Multiple Offset and Velocity Analysis", Geophysical Prospecting, pp. 99–112, Feb. 1994.

Ferber, R.–G., "Velocity Independent Time Migration and Velocity Analysis", Abstract of paper presented Jun. 1–5, 1992, pp. 556–557.

Hubral et al, "Interval Velocities From Seismic Reflection Time Measurements", Ed. by Kenneth L. Larner, Western Geophysical Company, Houston, TX, pp. 172–176.

Forel et al, "Three–Dimensional Perspective on Two–Dimensional Dip Moveout", Geophysics, vol. 53, No. 5 (May 1988) pp. 604–610 (Society of Exploration Geophysicists).

Knapp, R. W.; Leading Edge, V–4, No. 10, pp. 66–69, 108; Oct. 1985; abst. only herewith.

Ferher, R. G.; 54th EAEG Mtg, Paris France, Jun. 1, 1992; Copy in Geophys. Prosp., vol. 42, #2, pp. 99–112, Feb. 1994; abst. only herewith.

Ferber, R. G.; 54th EAEG Mtg., Paris, France, Jun. 1, 1992, pp. 556–557; abst. only herewith.

Ferber, R. G.; SEG Explor. & Develop. Geophys. Int. Conf. Moscow, Russia, Jul. 27, 1992, p. 157; abst. only herewith.

*Primary Examiner*—Nelson Moskowitz
*Attorney, Agent, or Firm*—Walter C. Farley

[57] ABSTRACT

A method for improving seismic sections includes generating seismic signals at source stations, recording seismic traces at receiver stations and gathering the seismic traces as a first gather at a common point as a function of the offsets between the source stations and the receiver stations. A common point (MMOCMP) is selected, a half-offset between source and receiver stations is redefined as a function of the distance between the selected common point MMOCMP and the RAWCMP, and the seismic traces are sorted as a function of the redefined half-offset, constituting a second gather of traces. The method permits one to obtain true located subsurface information at any desired point for velocity analysis.

8 Claims, 14 Drawing Sheets

FIG. 1A RAW CMP / NORMAL RAY

FIG. 1B DMO CMP / NORMAL RAY

FIG. 1C MMO CMP / IMAGE RAY

METHOD FOR IMPROVEMENT OF SEISMIC SECTIONS

CROSS-REFERENCE TO RELATED APPLICATION

This is a continuation of U.S. Pat. application 08/182,006 filed as PCT/EP93/01221, May 17, 1993 published as WO93/23771 Nov. 25, 1993 and now abandoned.

FIELD OF THE INVENTION

The invention relates to a method for improvement of seismic sections including generating seismic signal a source stations, recording of seismic traces at receiver stations and gathering said seismic traces as a first gather at a common point as function of offset between source station and receiver station. More specifically the invention relates to a method for evaluating velocity information at selected locations.

BACKGROUND OF THE INVENTION

Considerable difficulties in the evaluation of velocity information occur in areas of complex subsurface structure due to the presence of diffractions, sidewipe reflections, and multiples. Conventional seismic processing up to final time migration cannot adequately overcome these difficulties but is accepted as a key element for velocity macro model estimation based on the identification of major reflectors. This is one reason while there is still ongoing research on the derivation of migration velocities.

Figure 1A:
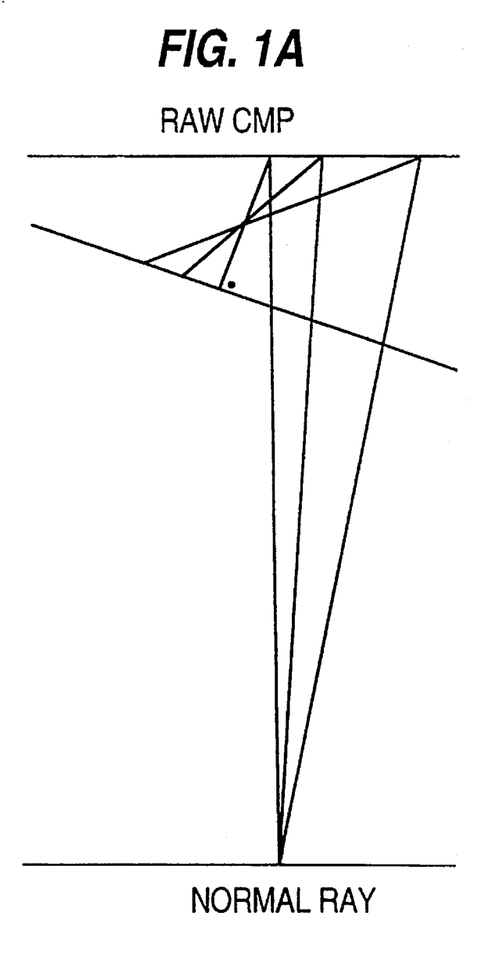
FIGS. 1A, 1B and 1C are schematic reflection diagrams, as seen in a vertical section through the earth, showing differences between conventional CMP gathering, DMO gathering and the gathering method according to the invention.

Conventional velocity analysis amounts to preprocessing the data and scanning for hyperbolic moveout. For horizontally layered media, the preprocessing consists of simple sorting into common midpoint (cmp) gathers, hereinafter called RAWCMP, while in general, more sophisticated preprocessing is needed to generate data sets which mimic cmp sorted field data. The RAWCMP gather contains velocity information encoded in the traveltime curves of reflection events related to the normal rays but biased and out of focus for dipping reflectors (FIG. 1A)

Figure 1B:
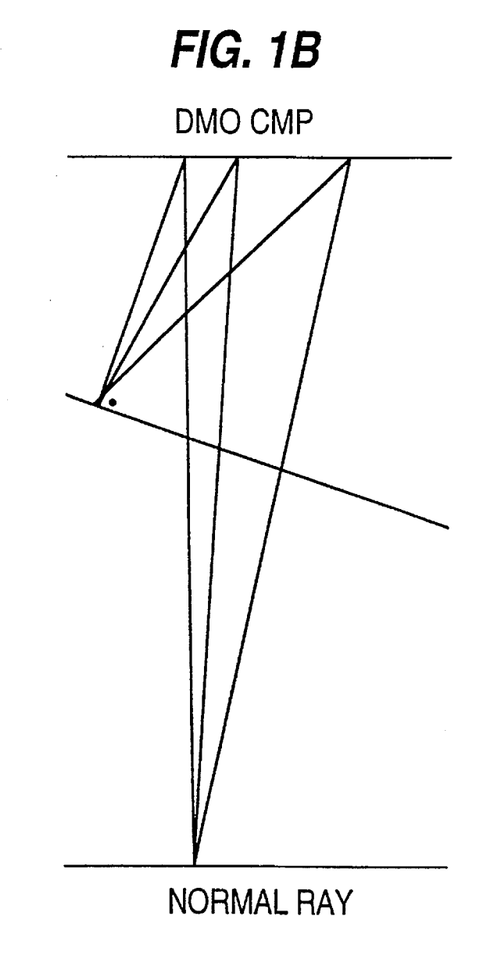

Forel, D. and Gardner, G. H. F., describe in "A three-dimensional perspective on two-dimensional dip moveout", 1988, Geophysics 53, 604–610, an algorithm which is able to convert any recorded seismic traces to an equivalent set of zero-offset traces. This dip moveout (DMO) algorithm can be applied to multifold inline data no matter what the variations in azimuth and offset may be. Due to the dip moveout correction to multiple offset, the velocity bias can be removed while a created DMOCMP (Dip Moveout Common Midpoint) gather now focusses on the common reflection points (FIG. 1b). DMO is viewed here as an operation which brings the data from an arbitrary initial configuration to preselected cmp. locations on the line segment from the source to the receivers without requiring any use of velocity. There is a trace in the target crop gather at a location where a velocity analysis is needed, after a linear squeezing of its time axis and a redefinition of its offset coordinate, both depending on the original offset and the distance of the traces cmp location to the target cmp.

A similar offset redefinition technique is disclosed by Hubral, P. and Krey, T. 1980, "Interval velocities from seismic reflection time measurements", SEG, to create migration-before-stack gathers. All traces having midpoints within a migration of prespecified radius centered at the target crop constitute these gathers.

A drawback of the DMO-technique is that the information in a DMO common midpoint stems from subsurface points located along normal rays which are normal to the corresponding layer. Thus, in case of dipping layers, the vertical projections of the subsurface points relating to the seismic events gathered in one common midpoint do not coincide. So, in order to bring the recorded seismic events into their right positions a migration has to be performed. Up to now for successful migration a detailed knowlegde of the velocities is required.

SUMMARY OF THE INVENTION

An object of the invention is to provide a method for improvement of seismic sections by velocity independent migration of seismic traces, and especially to provide possibilities for velocity analysis after the migration step.

According to the invention the sorted seismic traces constituting the second gather-contain seismic information of subsurface geology normal down under the free surface at said selected common point (MMOCMP) along the image ray. So one can get true located subsurface information at any desired point of view, e.g. at a point for velocity analysis.

The redefinition of offset due to the formula $$l^2 = h^2 - b^2 + r^2$$

can be generalized as velocity independent time migration. These "MMOCMP gathers" will contain a tremendeous number of traces (by a factor of several thousands compared to the original fold). Thus, the velocity analysis needed for correcting the normal moveout (NMO) of the gathered traces will be performed on migrated data having true offsets, being dip corrected and being less noisy.

With an embodiment in which those seismic traces of a second gather are selected from a neighborhood around the common point (MMOCMP), only seismic traces specified by their RAWCMP are selected within a predefined region around the common point MMOCMP in order to reduce the number of traces constituting the second gather.

Further reduction of data can be performed by stacking all traces of the second gather having substantially equal redefined offsets, thereby improving the prestack signal to noise ratio and enhancing constant velocity gather scans to derive the velocities. These gathers, while generated without requiring any velocity information, produce after conventional velocity analysis and stacking, a time migrated subsurface image at the common points (MMOCMP). From the analysis of MMOCMP gathers one gets the rms velocity along the image ray to each pickable event, providing a migrated velocity field.

Velocity picks from constant velocity stacks are thus based on correctly positioned data resembling geologic structure. For 2D data, the proposed technique is similar to dip moveout correction and migration before stack technique on comon offset sections using an initial velocity model, with the drawback of performing velocity analysis in an iterative loop. The new technique is a local one, i.e. acting only on the data in the neighborhood of a velocity analysis location and can be applied to 3D data sets as well. In fact, there is no difference between its application to 2D or 3D data sets.

BRIEF DESCRIPTION OF THE DRAWINGS

In the following details of the invention are described with reference to the accompanied drawings wherein.

DESCRIPTION OF THE PREFERRED EMBODIMENTS

Figure 1C:
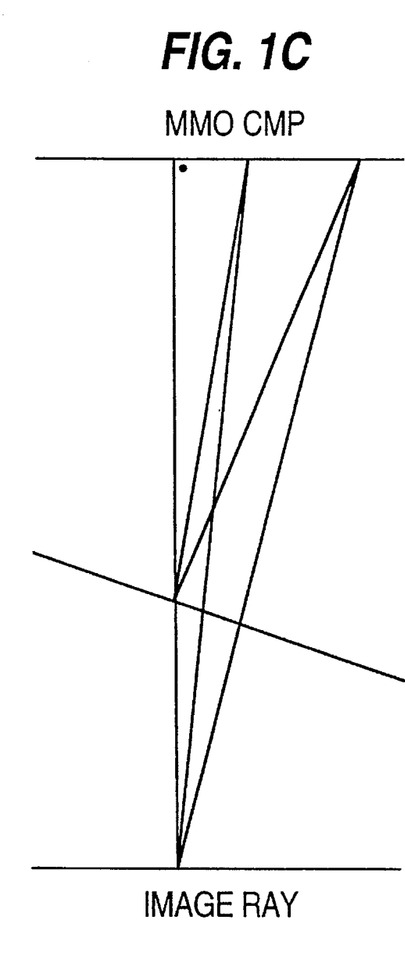

FIG. 1 shows velocity information encoded in travel times related to normal and image rays. The RAWCMP gather contains velocity information encoded in the travel times curves of reflection events related to the normal rays but biased and out of focus for dipping reflectors (FIG. 1A). Due to DMO the velocity bias can be removed while the created DMOCMP gather now focusses on common reflection points (FIG. 1B). After applying the method according to the invention the created MMOCMP gather shows travel times curves focussing on common scattering points along the image ray (FIG. 1c). While the RAWCMP data can be measured, both DMOCMP and MMOCMP gather respectively, have to be created by processing.

Figure 2A:
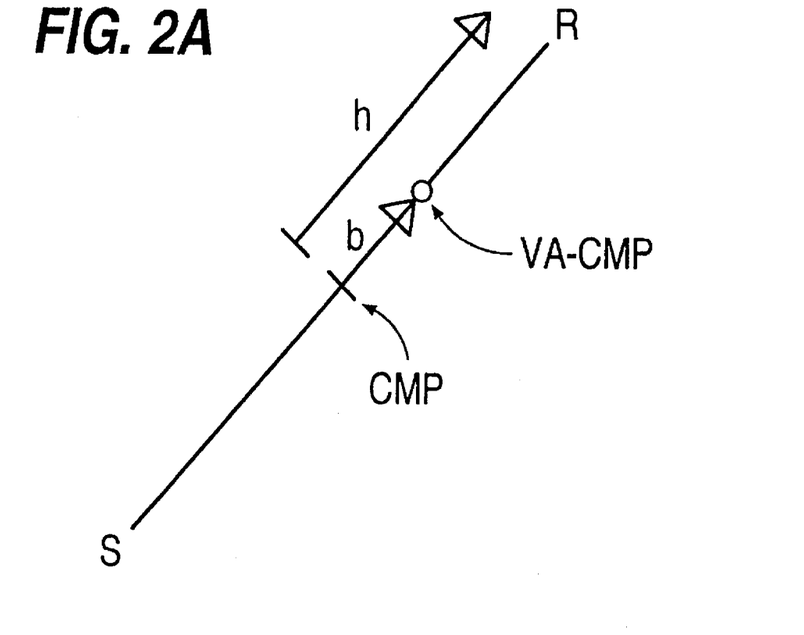
FIGS. 2A and 2B are schematic top plan views of a source and receiver pair.
Figure 2B:
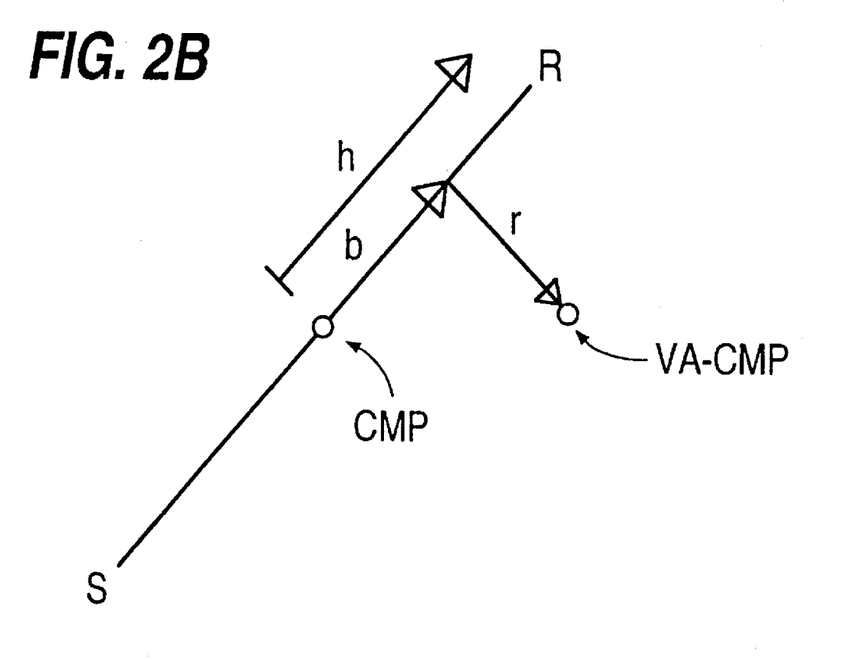

FIGS. 2A and 2B show the neighborhood of a velocity analysis location (VA-CMP) as defined by DMO (FIG. 2A) and MMO (FIG. 2B). In the first case a trace is said to be in the neighborhood if the VA-CMP is located on the line from source to receiver, while in the second case the VA-CMP may be located apart from that line within a predetermined distance. In essence, the neighborhood in the sense of MMO is richer in the number of traces than the neighborhood in the sense of DMO.

In a constant velocity medium, multi-offset gathers to undergo standard velocity analysis can be created by application of velocity independent DMO correction. These gathers consist of all traces with their midpoints coincident with the location where a velocity analysis is needed ("VA-CMP"). Additionally, transformed traces from neighboring cmps are incorporated into these gathers if the VA-CMP is located on the line segment joining source and receiver point. The transformation preferably first performs a linear squeezing of the time axis defined by a factor f followed by a redefinition of the half-offset coordinate. Let h denote the half-offset of the neighboring trace, and b the distance from the traces midpoint to the VA-CMP (FIG. 2A).

The time axis must be squeezed according to $$t < \to \tau = t \cdot f; f = \frac{k}{h} \; ; f^2 = \frac{h^2 - b^2}{h^2}$$

which can be read as "replace the original time $\tau$ by the new one which is equal to the original one multiplied by the ratio of k and h". The half-offset must be replaced by the new one, denoted by k, according to $$h^2 \leftarrow k^2 = h^2 - b^2.$$

The created crop gather will now show stacking hyperbolas, described by $$\tau^2(k) = \tau^2(0) + \frac{4}{v^2} k^2$$

in the new half offset coordinate.

By a generalization of the offset transformation, also traces from a wider neighborhood, i.e. from traces having not necessarily the VA-CMP on the line segment joining source and receiver, can be incorporated in the cmp gather used for velocity analysis.

Instead of replacing the half-offset according to $$h^2 \leftarrow k^2 = h^2 - b^2$$

use $$h^2 \leftarrow l^2 = h^2 - b^2 + r^2,$$

where r denotes the distance of the point on the line segment joining source and receiver specified by the distance b from the traces midpoint and the VA-CMP (FIG. 2b).

Surprisingly, the squeezing of the time-axis can remain unchanged. The created gather will now show stacking hyperbolas given by $$\tau^2(l) = \tau^2(0) + \frac{4}{v^2} l^2$$

in the new half-offset coordinate. A mathematical proof is given below. If the VA-CMP is located on the line segment joining source and receiver, said half-offset transformation coincides with DMO correction, because r equals zero in this case.

Figure 3A:
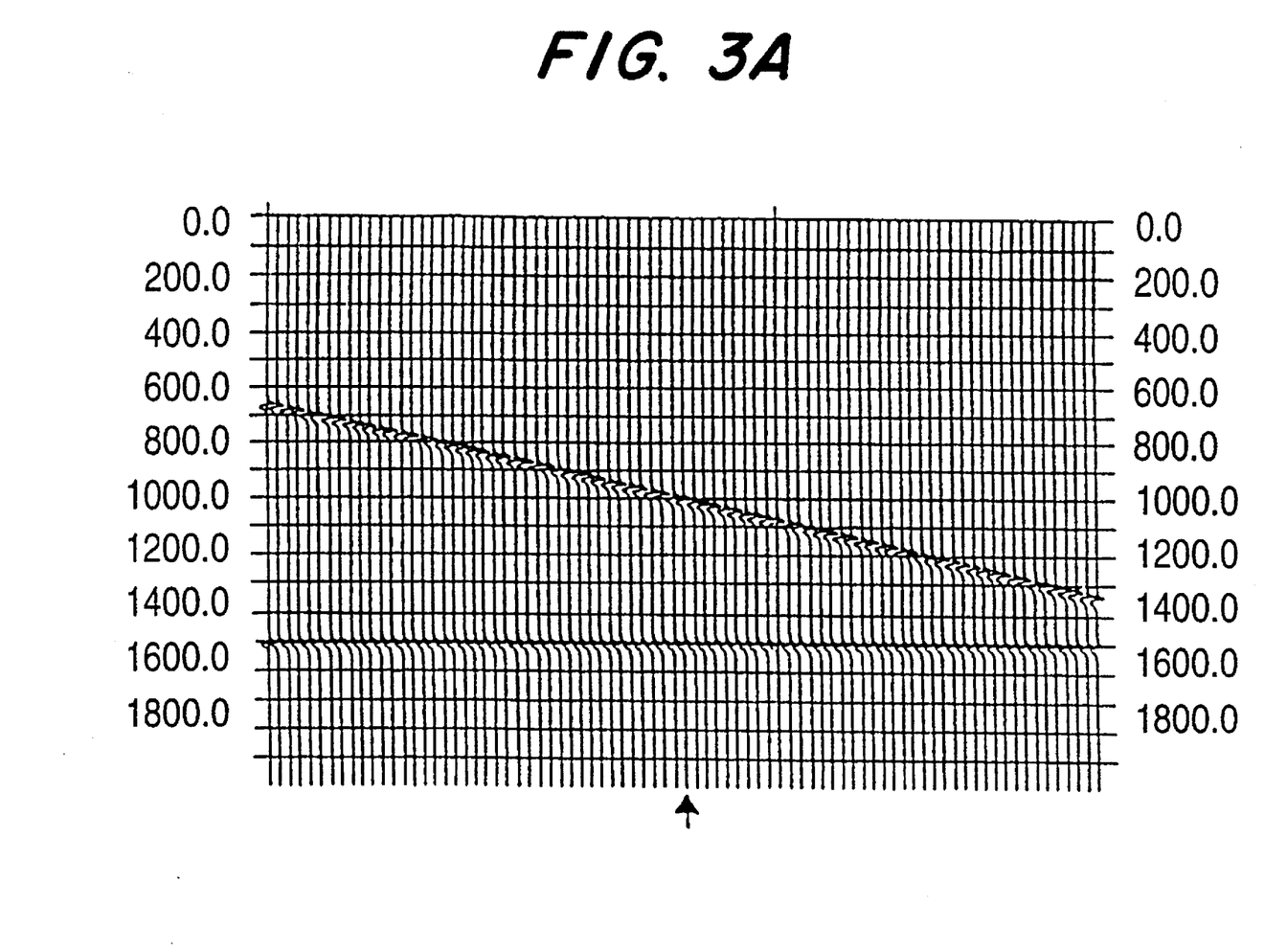
FIGS. 3A, 3B and 3C are representations of synthetic data for a three-layer subsurface model.
Figure 3B:
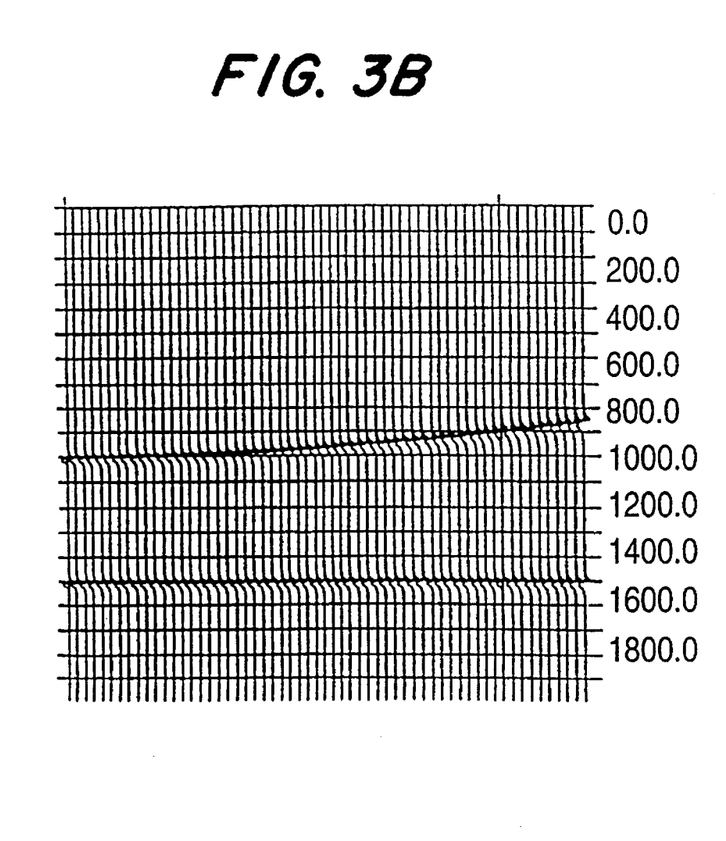
Figure 3C:
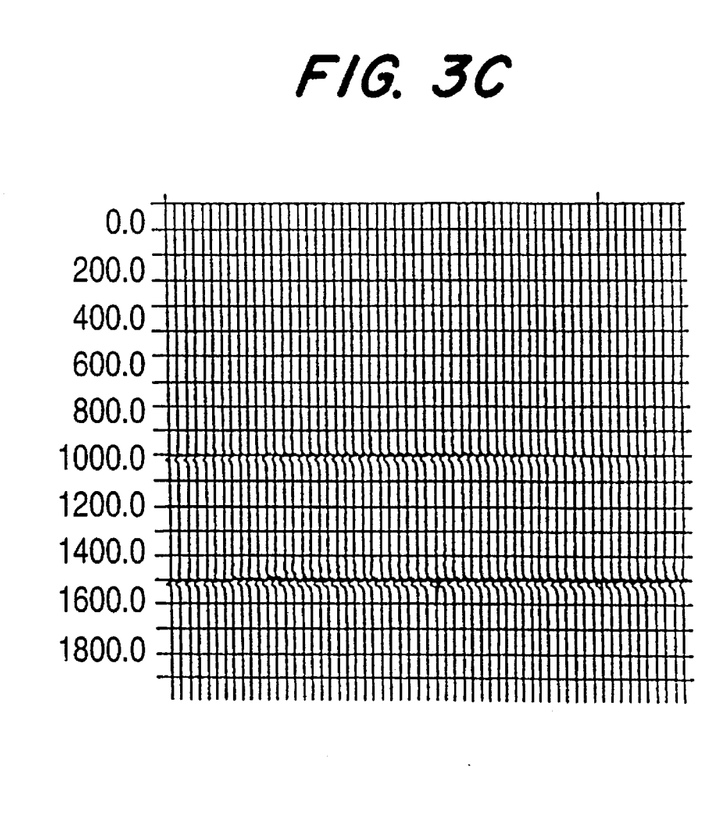

FIGS. 3A–3C show synthetic data for a three layer subsurface model related to the normal rays. The ideal zero-offset (normal ray) section (FIG. 3A) is shown together with a dynamically corrected RAWCMP gather (FIG. 3B) and DMOCMP gather (FIG. 3C) just from the middle of the section. The correction velocity used is the exact interval velocity. After DMO correction, the related cmp gather shows two perfectly corrected events located at the proper normal ray (zero-offset) two-way traveltime.

Figure 4A:
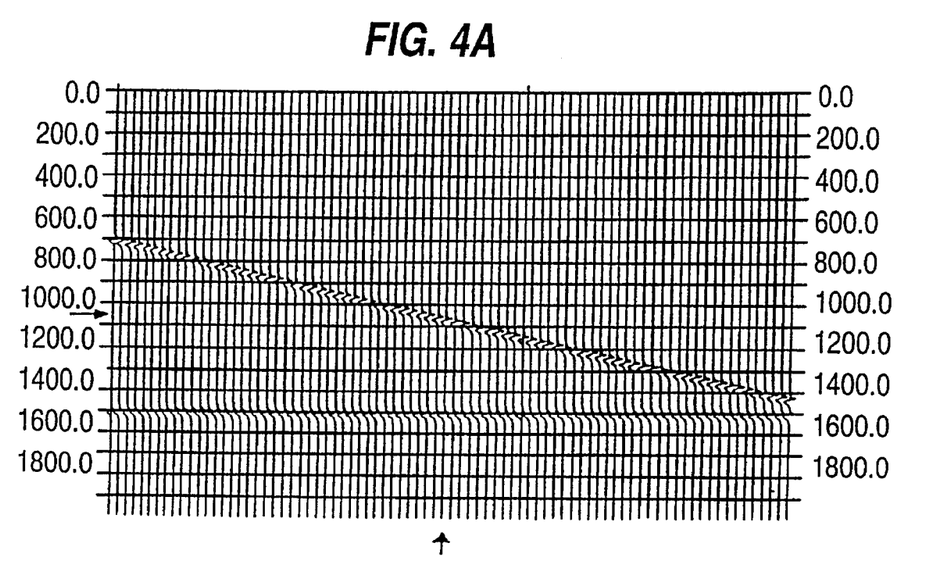
FIGS. 4A and 4B are representations of synthetic data for the model of FIGS. 3A–3C applying a gathering method according to the invention.
Figure 4B:
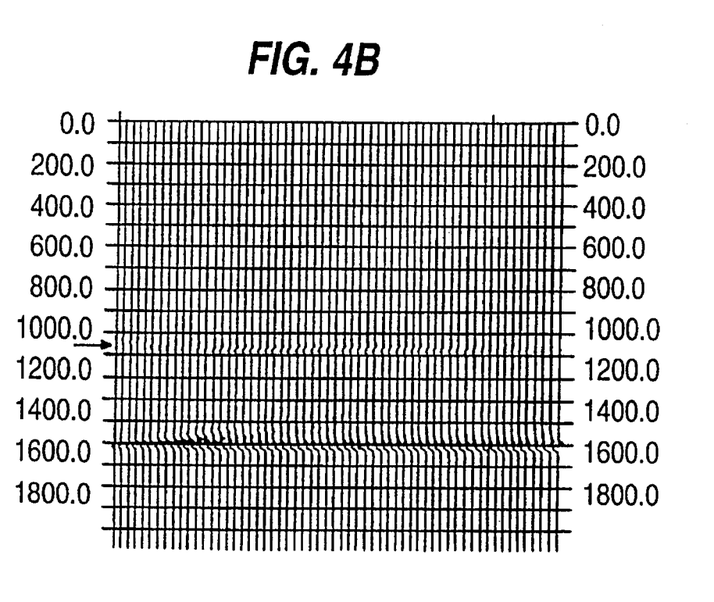

FIGS. 4A AND 4B shows synthetic data for a three layer subsurface model related to the image ray. The migrated zero-offset section FIG. 4A is shown together with a dynamically corrected MMOCMP gather FIG. 4B just from the middle of the section. Due to focussing along the image ray, the first perfectly corrected event occurs at a slightly greater traveltime (at about 1060 ms) compared to the normal ray section in FIG. 3A.

Figure 5A:
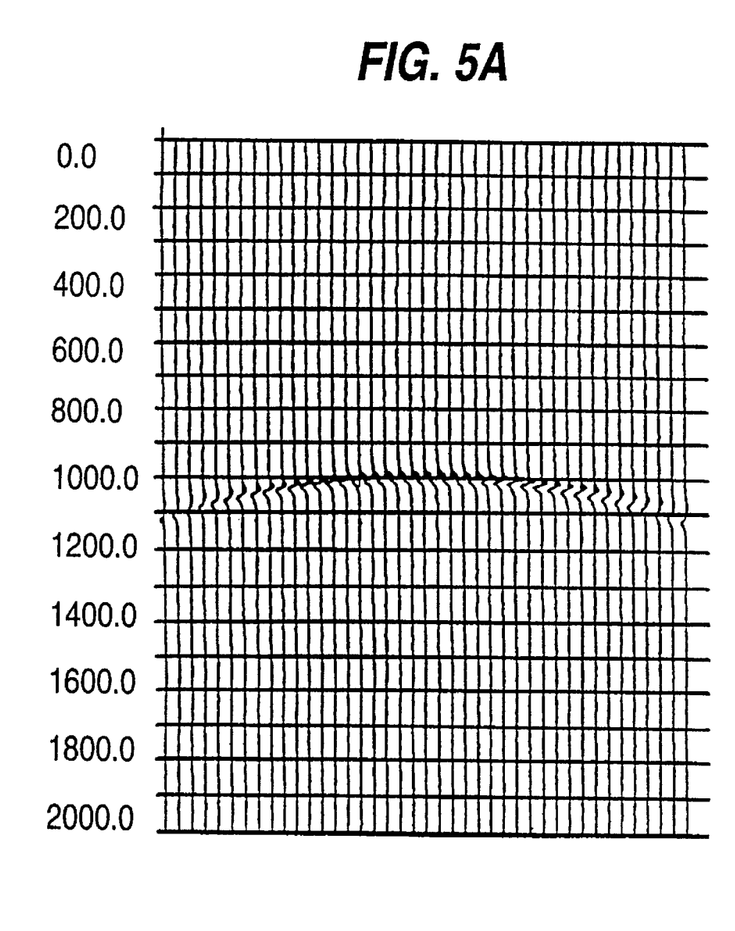
FIGS. 5A and 5B are representations of synthetic data of a subsurface model with a single scatterer.
Figure 5B:
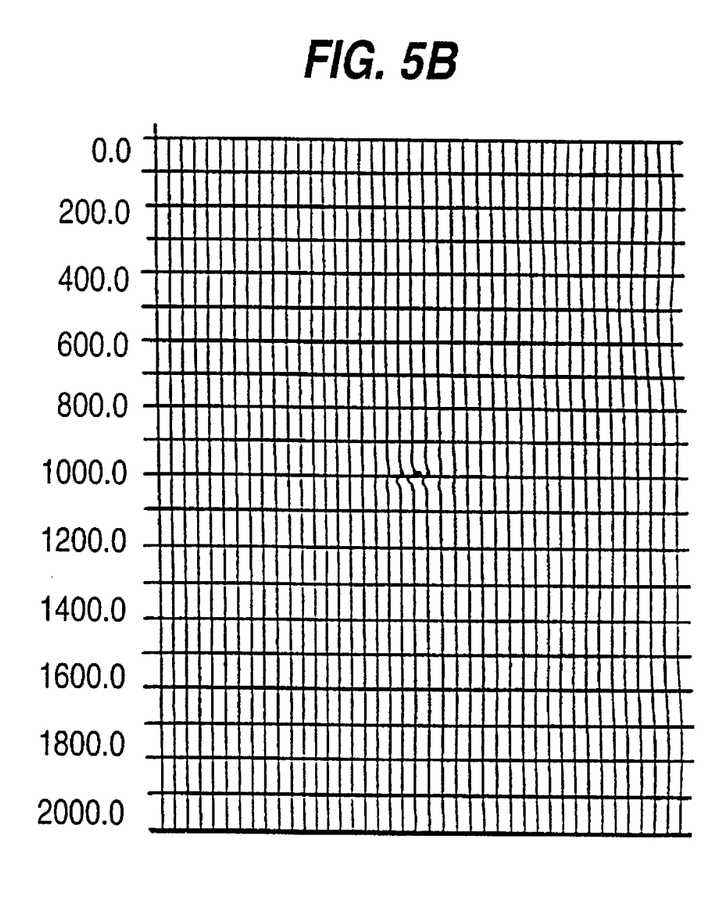

FIGS. 5A and 5B illustrate a single scatterer synthetic data set to which stacking of the created MMOCMP gathers was applied to produce the final time migrated section. Shown in (FIG. 5A) is the result of stacking the RAWCMP gathers due to a single scatterer at a depth of 1000 m in a homogeneous medium with a wave propagation velocity of 2000 m/s, while (FIG. 5B) shows the result of stacking after migration to multiple offset. As shown, the diffraction is collapsed to a small smudge located at the correct position.

A simple three layer subsurface model, consisting of equivelocity layers with a p-wave velocity of 2000 m/s, was selected to illustrate the use of migration to multiple offset. The interface to the second layer is located at a depth of 700 m at the left hand side of the model with a dip of 20, while the second interface is without any dip located at a depth of 1500 m. Shown in FIG. 3A is the ideal zero-offset section, pertaining to the normal rays, with a RAWCMP gather located just in the middle of the section shown in FIG. 3B after dynamic correction using a velocity of 2000 m/s. The correction for the dipping interface fails while the second one is corrected properly. After DMO correction to multiple offset, the related DMOCMP (FIG. 3C) shows two perfectly corrected events located at the proper normal ray two-way traveltime. For comparison purposes, in FIG. 4A shown is the migrated ideal zero-offset section, correctly placing the reflectors (even the dipping one) in time (and depth due to the constant velocity medium). The created MMOCMP gather after 2000 m/s dynamic correction is shown in FIG. 4B, with two vertically aligned events at the proper image ray traveltime, slightly greater (at about 1060 ms compared to 1000 ms) for the dipping event as compared to the zero-offset section.

To demonstrate again that stacking of the created MMOCMP gathers produces the final time migrated section, the homogeneous model with a p-wave velocity of 2000 m/s and a single scatterer located in the middle at a depth of 1000 m is used. The result of stacking the RAWCMP gathers (the diffraction hyperbola) is shown in FIG. 5A, while the result of stacking the MMOCMP gathers is shown in FIG. 5B, where in both cases the dynamic correction uses the medium velocity. As is shown, the diffraction is collapsed to a small smudge located at the correct position.

Figure 6A:
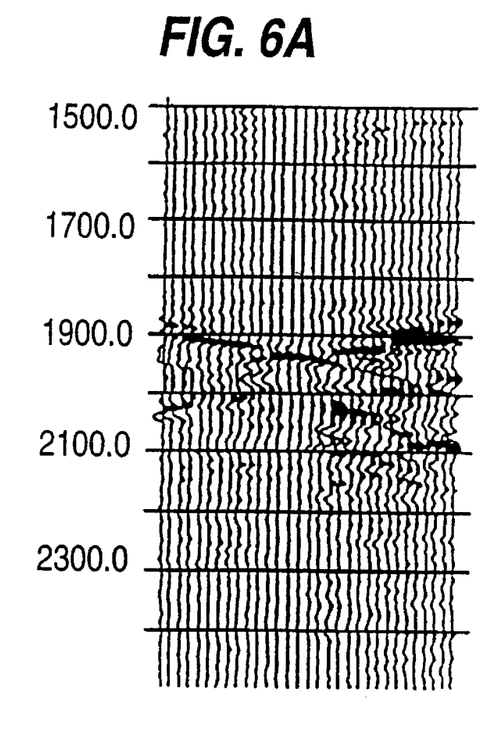
FIGS. 6A, 6B and 6C are diagrams of stacked actual data comparing conventional CMP- and DMO-gathering methods with the method of the invention.
Figure 6B:
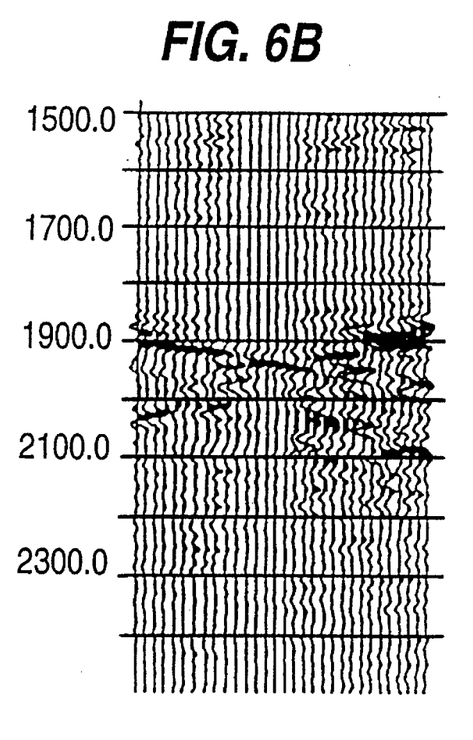
Figure 6C:
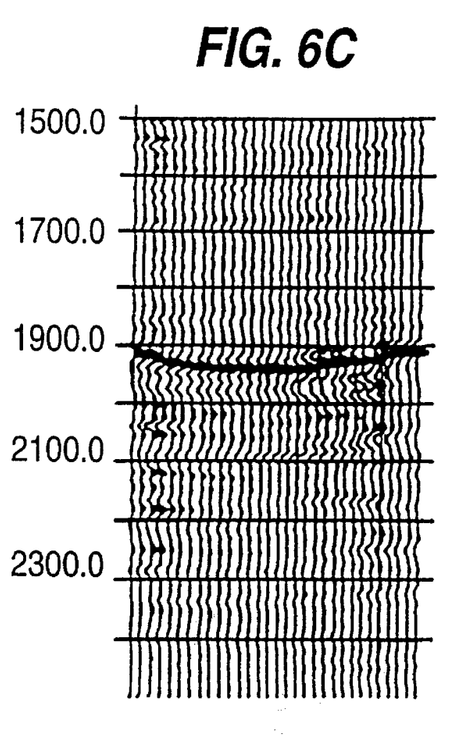

FIG. 6A-6C show stacked actual data above a synclinal structure. Using a preliminary stacking velocity shown are the stack of the RAWCMP (FIG. 6A) and MMOCMP (FIG. 6B) gather related to the normal rays, and the stack of the MMOCMP gathers related to the image ray. The distinct differences between stacked and migrated images of synclinal structures clearly show up.

With respect to the distinct differences in their stacked and migrated images respectively a preliminary stacking velocity analysis was made at the central cmp location. Using the derived velocity function as reference, 15 cmp gathers to the left and right hand side of the central location were corrected dynamically and stacked.

Figure 7A:
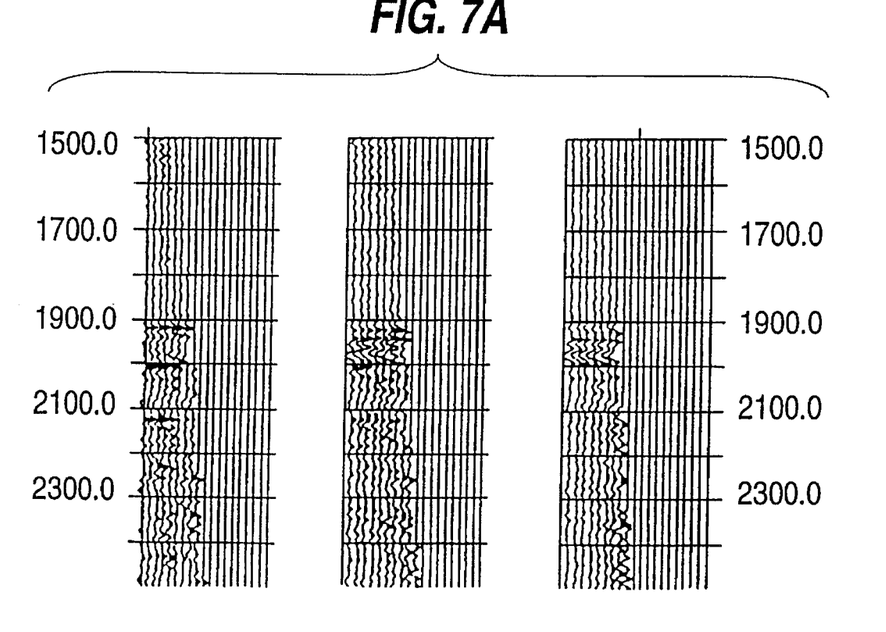
FIGS. 7A and 7B are diagrams of three consecutive gathers from the actual data of FIG. 6.
Figure 7B:
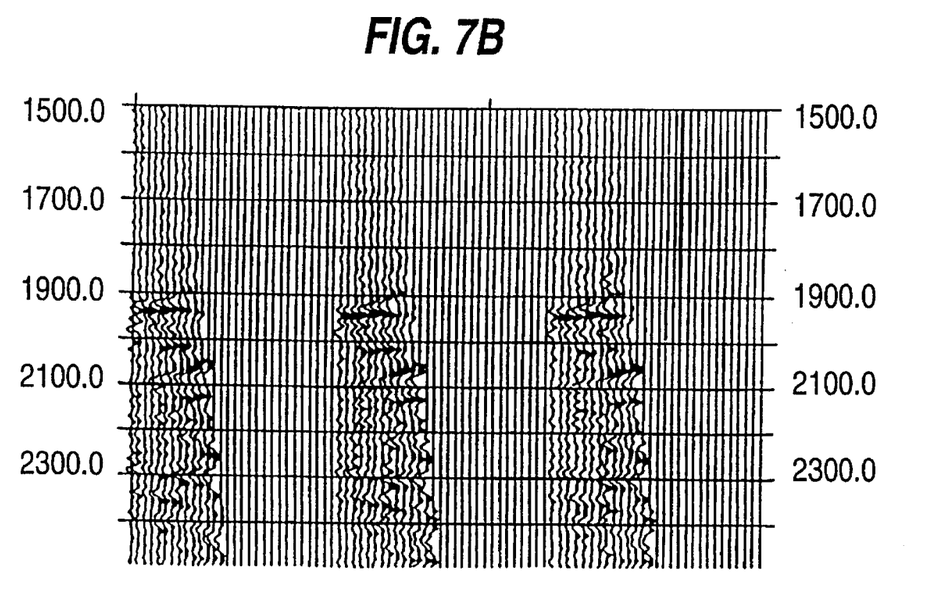
Figure 8A:
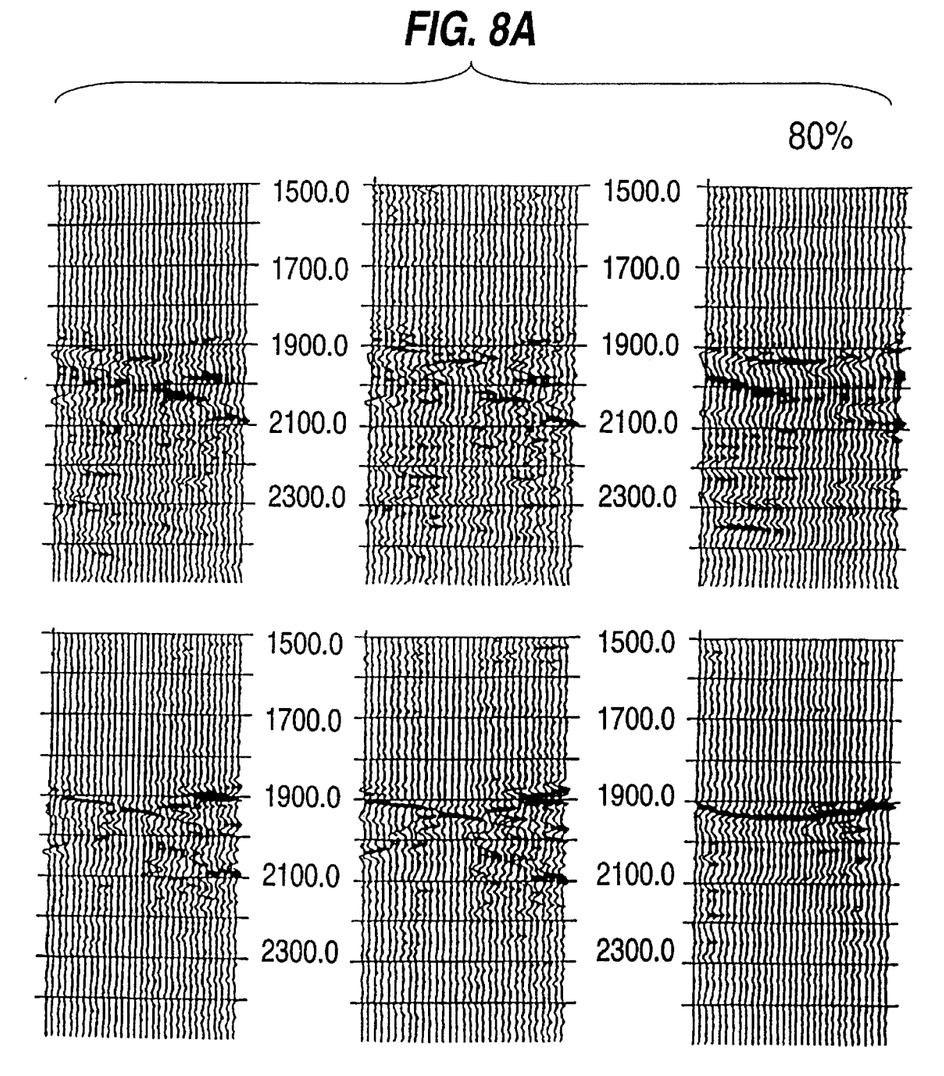
FIGS. 8A, 8B, 8C and 8D are diagrams of stacks with procentual velocity variation.
Figure 8B:
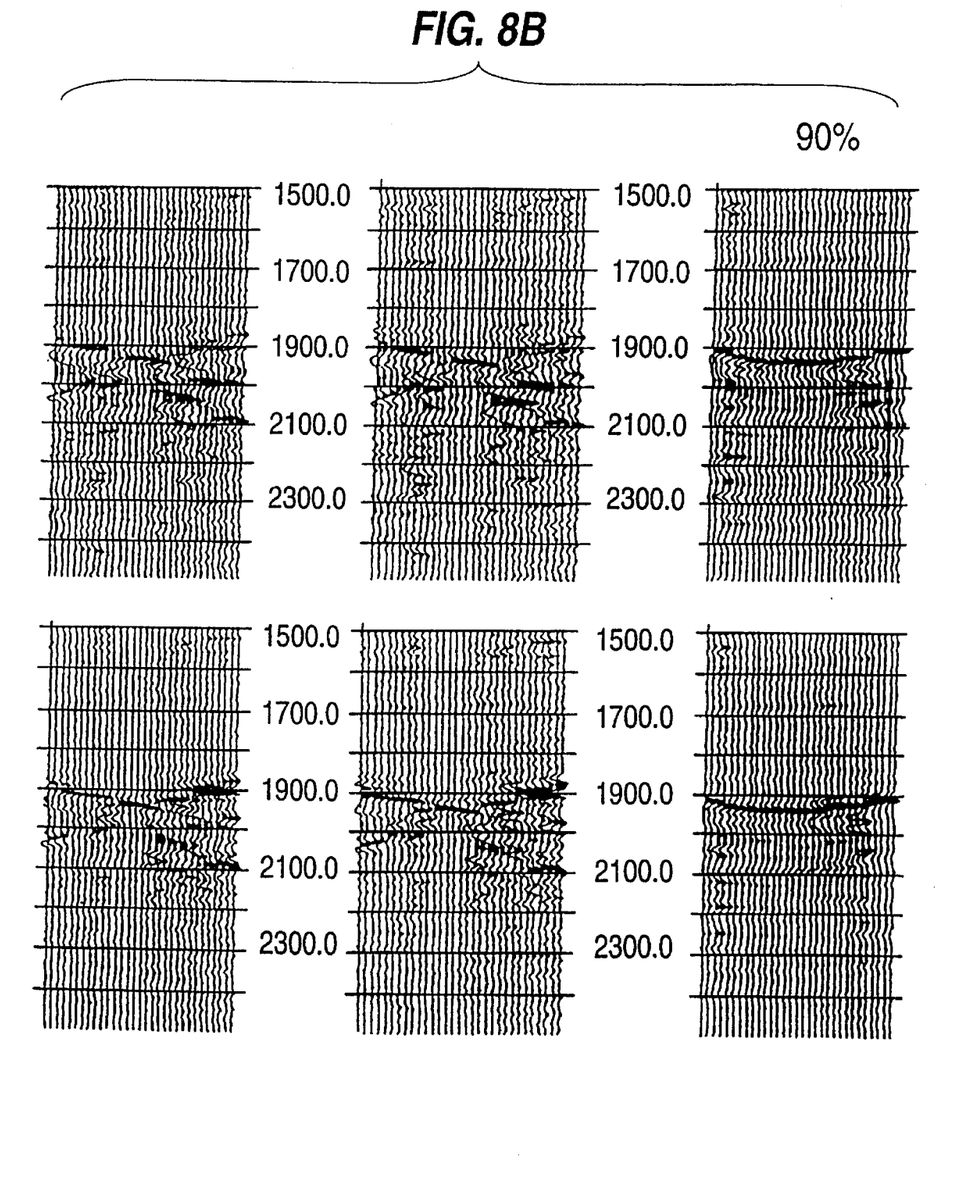
Figure 8C:
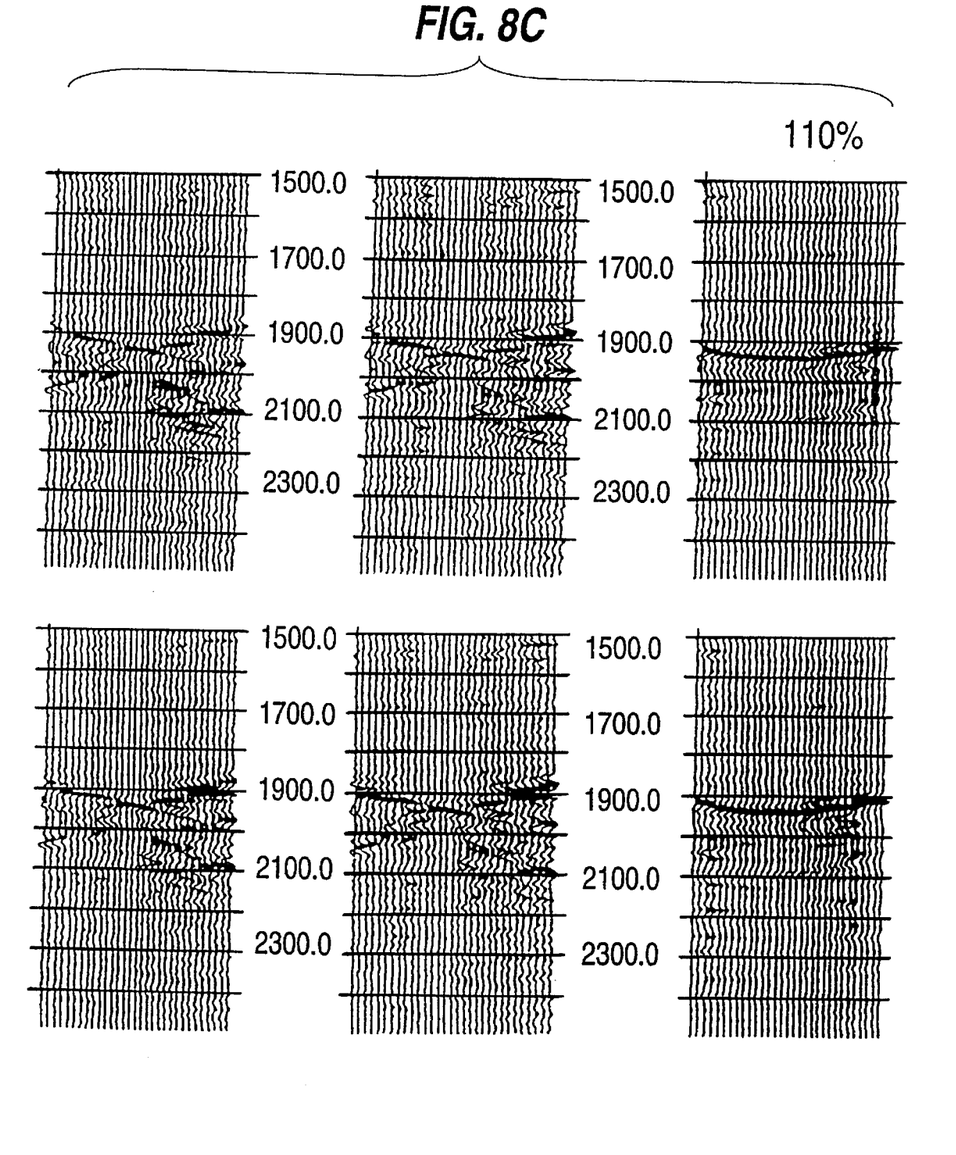
Figure 8D:
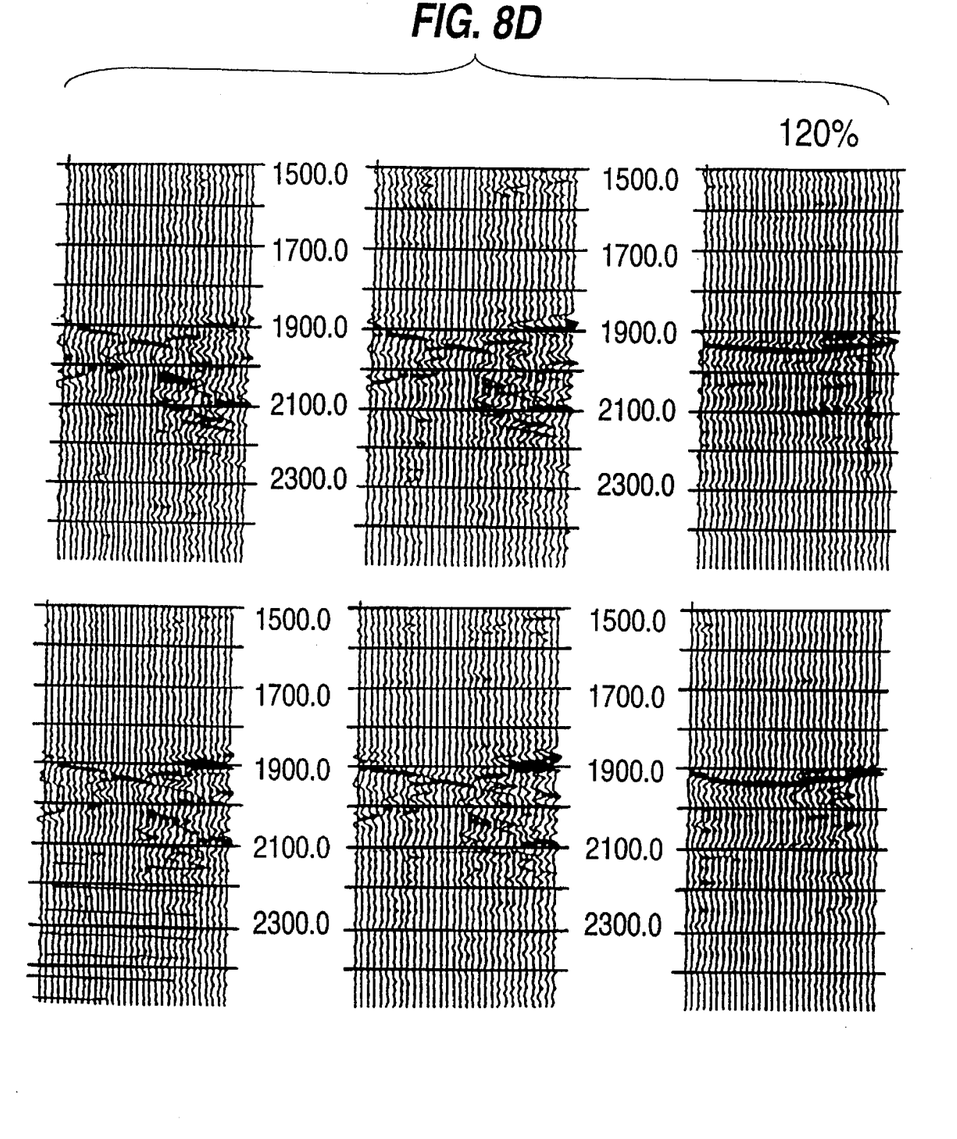

Shown in FIG. 6A is the stack of the RAWCMP, in 6B the stack of the DMOCMP, and finally in 6C the stack of the MMOCMP gathers. Distinct differences occur in these subsurface images between the display of stacks pertaining to the normal rays (FIG. 1A and 1B) and the stack related to the image ray (FIG. 1C), the time migrated image, showing the correct subsurface structure. The difference between the RAWCMP stack and the DMOCMP stack can be neglected. In FIGS. 7A and 7B are shown 3 cmp gathers just above the middle of the left hand flank after dynamic correction using the reference velocity. The MMOCMP gathers compared to the RAWCMP gathers show a slightly better signal to noise ratio and a slight time shift of the event just below 1900 ms due to the migration from the normal ray to the image ray. The velocity analysis may now be carried out by inspecting a scan of function stacks with procentual variation about the reference velocity function from 80% through to 120%, displayed here with an incremental step of 10%. Each panel shown in FIG. 8A to 8D displays in the top row the result of test stacking with the procentually varied velocity function, while the bottom row shows the 100% function stack for comparison. Again from left to right the RAWCMP, the DMOCMP and finally the MMOCMP stacks are shown. The 80% function stack (FIG. 3A) ist totally out of focus, while the focussing improves from 90% through to 110%. Especially the 110% MMOCMP stack shows excellent continuity. In general, the reference velocity function underestimates the best focussing velocities. FIGS. 7A and 7B each show three consecutive gathers just above the left hand flank of the snyclinal structure data set after dynamic correction using the preliminary velocity function. The MMOCMP gathers (FIG. 7B) compared to the RAWCMP gathers (FIG. 7A) show a slightly better signal to noise ratio and a slight time shift of the event just below 1900 ms due to the migration from the normal ray to the image ray.

FIGS. 8A–8D show function stacks with procentual variation of 80% (FIG. 8A), 90% (FIG. 8B), 110% (FIG. 8C) and 120% (FIG. 8D) about the reference velocity derived from preliminary stacking velocity analysis. The upper pad of each panel shows the procentual variation while the lower part shows the 100% stack for comparison. From left to right shown are the normal ray related RAWCMP and DMOCMP stacks, and finally the image ray related MMOCMP stacks (i.e. the migrated data).

The mathematical point that the suggested generalization of the DMO half-offset transformation works is the incorporation of zero-offset time-migration into the prevelocity analysis processing sequence, introducing an additional moveout given by $$r^2/(v/2)^2.$$

Figure 9:
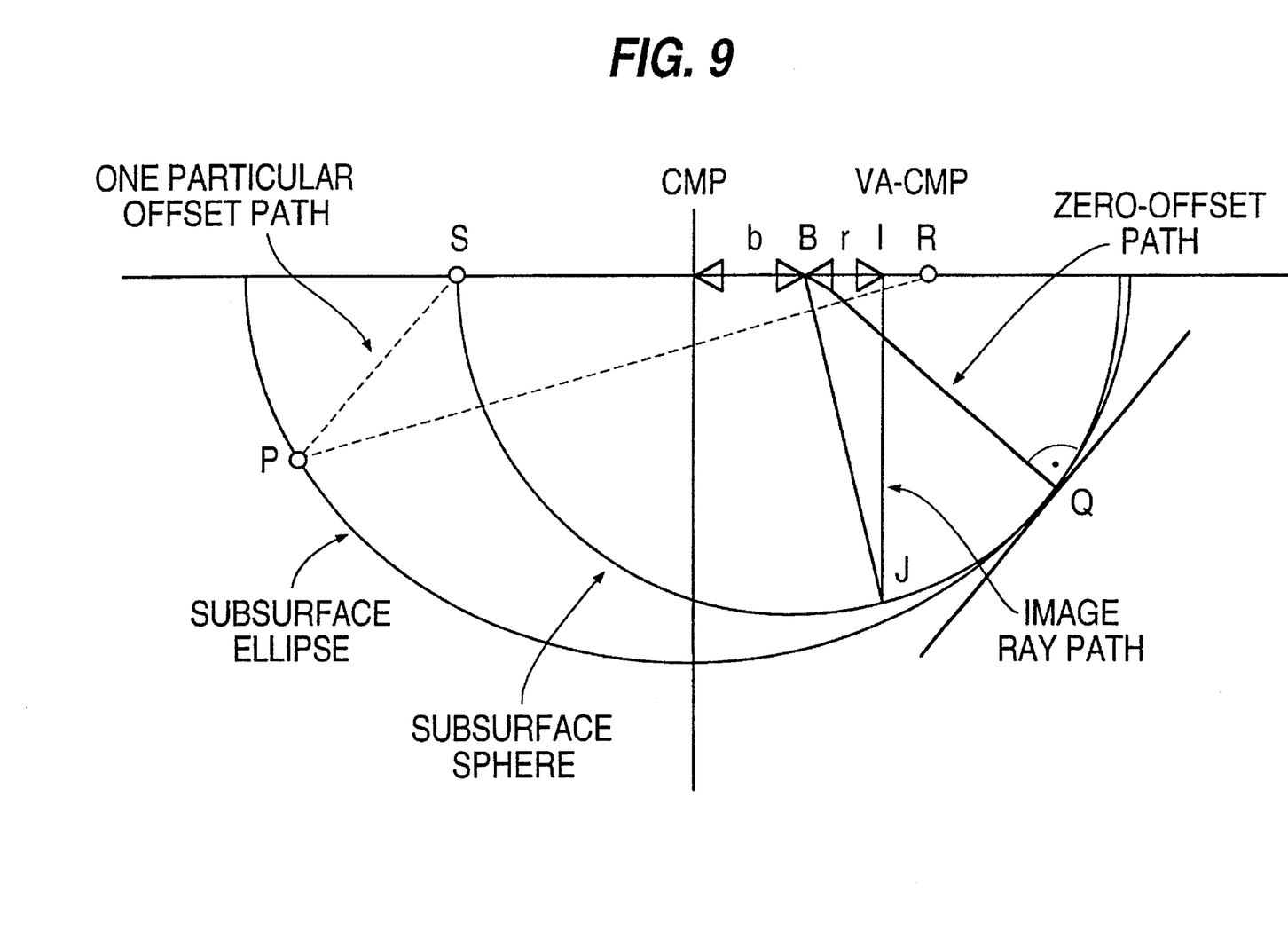
FIG. 9 is a schematic sectional view of a subsurface ellipse and sphere showing a normal ray (zero offset) path and an image ray path.
Figure 10:
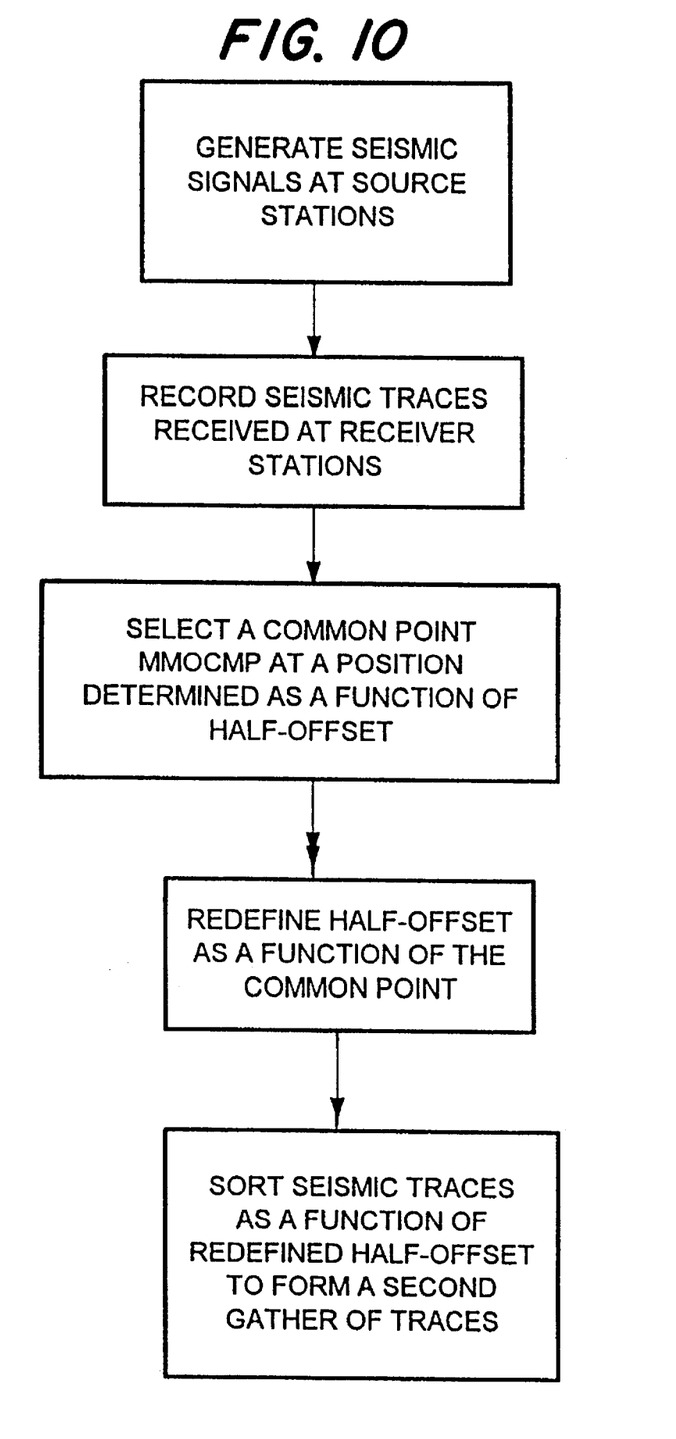
FIG. 10 is a flow diagram illustrating the method of the invention.

An event at offset time $t_{z,900}$ on a trace with half-offset h is spread over an ellipsoidal surface by migration. A cross section through the line segment joining source and receiver is shown in FIG. 9. The offset time is the same for all travel paths SPR, while the zero-offset time corresponds to the path BQB for a zero-offset location with a distance b from the midpoint. The distance from B to Q defines a subsurface half sphere of possible scatterers generating zero-offset reflection signals with identical timing. The relation between offset and zero-offset-times was proven to be (Forel and Gardner, 1988)

$$t_0^2 = \left( t_h^2 - \frac{4h^2}{v^2} \right) \left( 1 - \frac{b^2}{h^2} \right)$$

while the image time $t_i$ i.e. the travel time along the image ray from J to I is given by $$t_i^2 = t_0^2 - \frac{4r^2}{v^2}$$

where r denotes the radius of the surface circle around B. Note that the image ray travels with half the velocity.

Inserting the last equation into the previous one gives $$t_i^2 = \left( t_h^2 - \frac{4h^2}{v^2} \right) \left( 1 - \frac{b^2}{h^2} \right) - \frac{4r^2}{v^2} = \frac{h^2 - b^2}{h^2} \cdot t_h^2 - \frac{4}{v^2}(h^2 - b^2 + r^2)$$

which comes along as the conventional stacking hperbola if the offset time is squeezed by k/h, where $$k^2 = h^2 - b^2,$$

and the half-offset coordinate is replaced by $$l^2 = k^2 + r^2.$$

I claim:

1. A method for improving seismic sections comprising the steps of generating seismic signals at a plurality of source stations;

recording seismic traces at a plurality of receiver stations;

selecting a common point (MMOCMP) having a position defined by $$l^2 = h^2 - b^2 + r^2$$

wherein h is a half-offset between a source station and a receiver station and defines RAWCMP, b is a distance between RAWCMP and a point on a line joining said source station and receiver station corrected by dip moveout, thereby defining DMOCMP, r is a distance between DMOCMP and MMOCMP, and l is a distance between the selected common point MMOCMP and the RAWCMP;

gathering the recorded seismic traces as a first gather at said common point;

redefining half-offset l as a function of the common point; and sorting the seismic traces as a function of the redefined half-offset l, thereby forming a second gather of traces.

2. A method according to claim 1 and including squeezing a time axis of the seismic traces by a factor f due to dip moveout correction wherein $$f^2 = \frac{h^2 - b^2}{h^2}.$$

3. A method according to claim 1 wherein seismic traces constituting said second gather are selected from a predetermined area adjacent the common point (MMOCMP).

4. A method according to claim 3 wherein seismic traces of the second gather having substantially equal offsets are stacked to form a third gather.

5. A method according to claim 1 and further including performing migration transformation by normal moveout correction of traces of the second or third gather by $$\tau^2(l) = \tau^2(0) + \frac{4}{v^2} l^2$$

wherein $\tau(0)$ is zero-offset travel time and v is rms velocity.

6. A method according to claim 5 and including scanning for hyperbolic moveout to derive rms velocities.

7. A method according to claim 6 and including regridding a three dimensional seismic survey by selecting a grid of locations and performing the steps of the method at each location.

8. A method according to claim 6 and further including NMO processing using said derived rms velocities comprising stacking NMO corrected traces and applying a migration step.

* * * * *